United States Patent
Marsh et al.

(12) 
(10) Patent No.: US 6,230,668 B1
(45) Date of Patent: May 15, 2001

(54) LOCOMOTIVE COOLING SYSTEM

(75) Inventors: Gregory Alan Marsh; Brian Lane Walter; Peter Loring Valentine; Mahesh Chand Aggarwal, all of Erie, PA (US); Abul Kalam Mohammad Shariful Islam, Ottawa (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/576,626

(22) Filed: May 22, 2000

(51) Int. Cl.[7] ....................................................... F01P 5/10
(52) U.S. Cl. ................................... 123/41.44; 123/41.51
(58) Field of Search ............................. 60/643, 668, 651; 123/41.01, 41.44, 41.51

(56) References Cited

U.S. PATENT DOCUMENTS

| | | |
|---|---|---|
| 3,397,684 | 8/1968 | Scherenberg . |
| 3,621,907 | 11/1971 | Ephraim, Jr. et al. . |
| 3,648,715 | 3/1972 | Boothe . |
| 3,771,293 | 11/1973 | Vest . |
| 3,863,612 | 2/1975 | Wiener . |
| 4,061,187 | 12/1977 | Rajasekaran et al. . |
| 4,133,185 | 1/1979 | Dickey . |
| 4,231,384 | 11/1980 | Christensen . |
| 4,413,595 | 11/1983 | Potts, Jr. . |
| 4,592,323 | 6/1986 | Vest . |
| 4,656,973 | 4/1987 | Endres . |
| 4,662,318 | * 5/1987 | Hayashi ........................ 123/41.44 X |
| 4,711,204 | 12/1987 | Rusconi . |
| 4,894,780 | 1/1990 | Simonyi et al. . |

(List continued on next page.)

FOREIGN PATENT DOCUMENTS

| | | |
|---|---|---|
| 0 389 502 B1 | 3/1993 | (EP) . |
| 0 499 071 B1 | 8/1994 | (EP) . |
| 0721 060 A2 | 7/1996 | (EP) . |
| 0 857 958 A1 | 8/1998 | (EP) . |
| 0 875 631 A1 | 11/1998 | (EP) . |
| 08186926 | 7/1996 | (JP) . |
| 09195777 | 7/1997 | (JP) . |

OTHER PUBLICATIONS

Jean–Pierre Moranne, Jerome J. Lukas; SAE Technical Paper Series; International Congress & Exposition; Feb. 27–Mar. 2, 1994; Air–To–Air Turbo . . .

Geoffrey Bond & Robert M. Brooks; SAE Technical Paper Series; West Coast International Expo; Aug. 6–Aug. 9, 1984; Selection of the Optimized After . . .

R. A. Nutt & R. F. Poehlman; SAE Technical Paper Series; West Coast International Meeting; Aug. 16–Aug. 19, 1982; Cooling System Requirements . . .

Primary Examiner—Hoang Nguyen
(74) Attorney, Agent, or Firm—Carl A. Rowold, Esq.; Holland & Knight LLP; David G. Maire, Esq.

(57) ABSTRACT

A cooling system (10) for a turbocharged locomotive engine (12) including a two stage intercooler (20) for conditioning the combustion air (16). A first coolant loop (32) includes a first stage intercooler (38), the engine coolant passages (22), a radiator (34), a first tank (36), an oil cooler (30), and a first pump (40). A second coolant loop (42) includes a second stage intercooler (44) a subcooler (48), a second tank (46), and a second pump (50). A fluid connection is provided between the first coolant loop (32) and the second coolant loop (42) to provide heat there between during conditions of overcooling of the second coolant loop (42). Flow control valves forming a portion of first coolant loop (32) may be embodied in a single rotor-sleeve flow control valve (130).

20 Claims, 4 Drawing Sheets

U.S. PATENT DOCUMENTS

| | | |
|---|---|---|
| 4,907,645 | 3/1990 | Dumas et al. . |
| 4,955,431 | 9/1990 | Saur et al. . |
| 4,961,404 | 10/1990 | Itakura et al. . |
| 5,036,803 | 8/1991 | Nolting et al. . |
| 5,074,254 * | 12/1991 | Takamatsu ..................... 123/41.44 |
| 5,201,285 | 4/1993 | McTaggart . |
| 5,275,231 * | 1/1994 | Kuze ............................ 123/41.1 X |
| 5,353,757 | 10/1994 | Susa et al. . |
| 5,392,741 | 2/1995 | Uzkan . |
| 5,415,147 | 5/1995 | Nagle et al. . |
| 5,566,745 | 10/1996 | Hill et al. . |
| 5,598,705 | 2/1997 | Uzkan . |
| 5,669,311 | 9/1997 | Hill et al. . |
| 5,828,967 | 10/1998 | Ueda . |
| 6,006,731 | 12/1999 | Uzkan . |

* cited by examiner

LOCOMOTIVE COOLING SYSTEM

BACKGROUND OF THE INVENTION

This invention relates generally to internal combustion engines, and more particularly to turbocharged engines used in locomotives, and specifically to a method and apparatus for cooling a turbocharged diesel locomotive engine.

Internal combustion engines, such as the turbocharged diesel engines utilized for rail locomotives, require cooling systems to limit the temperatures of various engine components. Internal combustion engines are known to be designed with internal cooling passages for the circulation of coolant to remove heat energy from the engine components. Lubricating oil which is circulated throughout the engine to reduce friction will also absorb heat and, therefore, will also require cooling to avoid reaching temperatures that would detrimentally affect its lubricity. Diesel engines often utilize turbochargers to increase power by compressing the intake combustion air to a higher density. Such compression results in the heating of the combustion air, which must then be cooled prior to its use to enable the engine to have high volumetric efficiency and low emissions of exhaust pollutants. For mobile applications such as rail locomotives, the only readily available heat sink is the surrounding ambient air. It is known to utilize a pumped cooling medium, such as water, to transport heat to finned radiator tubes. The radiator tubes then transfer the heat to the ambient air, often using forced convection provided by fans.

It is desirable to maintain an internal combustion engine and its associated intake combustion air at two different temperatures in order to optimize the performance of the engine. U.S. Pat. No. 3,863,612 dated Feb. 4, 1975, and assigned to the assignee of the present invention, describes a cooling system for a turbocharged diesel engine wherein coolant is provided at one temperature to the cylinder jackets of the engine, and coolant at a lower temperature is provided to an intercooler for cooling the compressed combustion air. This system utilizes a single pump, heat exchanger, and temperature control valve to accomplish the dual cooling objectives.

The U.S. Pat. No. 5,415,147 issued on May 16, 1995, also assigned to the assignee of the present invention, teaches a split temperature cooling system for a turbocharged internal combustion engine. This system provides improved cooling capability by utilizing a subcooler in addition to a radiator. The subcooler is located upstream of the radiator in the flow of cooling ambient air. The use of a subcooler provides a greater temperature difference capability between the temperature of the engine and the temperature of the combustion air. Furthermore, this patent teaches a valve system whereby heated coolant may be directed to the intercooler to heat the combustion air during periods of very low ambient temperature when the combustion inlet air temperature would otherwise drop below an optimal value.

The above systems are known as "wet/dry systems" because the coolant is drained from the radiator during periods of low heat rejection demand. An alternative system is taught in U.S. Pat. No. 5,598,705 issued on Feb. 4, 1997, which teaches a "wet system" wherein the water remains in the radiator at all times. The '705 patent teaches a cooling system utilizing two separate coolant loops. A main coolant loop having a pump and a radiator is used to provide cooling to the engine. An aftercooler coolant loop having a separate pump and radiator is used to provide cooling for the combustion air aftercooler. The utilization of a separate cooling loop allows the aftercooler loop to be sized to bring the engine combustion air temperature as close as practical to the temperature of the ambient air without constraining the size or coolant flow rate of the engine and oil cooler radiator. One of the disadvantages of such a wet system is the possibility of freezing of the water in the system, particularly in the aftercooler coolant loop. To prevent overcooling of the aftercooler or freezing of the water in the aftercooler loop, linking conduits are provided between the two loops to allow heated coolant to flow therebetween.

For locomotive applications, ambient air flow through the radiators is normally provided by a multi-speed fan, since the radiators are positioned on the roof of the locomotive. It is known that cycling of a fan between speeds causes excessive heating of the fan motor, excessive power usage, and possible premature failure of the motor. As the demand for more efficient locomotive engine operation increases, the range of allowable temperatures for optimal operation have become narrowed. Prior art cooling systems are thus more prone to excessive fan cycling in an effort to maintain temperatures within desirable narrow ranges. Furthermore the United States Environmental Protection Agency has announced more restrictive emissions limits for oxides of nitrogen to be effective on Jan. 1, 2002. One approach for meeting these more restrictive requirements is to restrict the peak temperature of the intake combustion air. The level of combustion air intercooling needed to meet the new EPA NOx requirements will likely not be achievable with prior art cooling systems during periods of peak engine power demand and peak ambient temperature.

BRIEF SUMMARY OF THE INVENTION

Thus there is a particular need for a cooling system for a turbocharged diesel locomotive engine that provides for improved cooling for the combustion intake air. There is also a particular need for a cooling system providing an improved level of control to maintain the engine, lubricating oil and combustion air temperatures within respective narrow temperature ranges without excessive fan cycling. Such a system should also avoid problems associated with freezing during periods of very low ambient temperature and with excessive cooling during periods of reduced cooling demand.

A locomotive engine is described herein as having coolant passages formed therethrough and having a turbocharger for providing combustion air through an intercooler having coolant passages formed therethrough, the engine further having a cooling apparatus comprising: a first coolant loop comprising a radiator having an inlet connected to an outlet of the engine coolant passages, a first tank having an inlet connected to an outlet of the radiator and an outlet connected to an inlet of the engine coolant passages, a first stage of the intercooler having an inlet connected to the outlet of the first tank and an outlet connected to the inlet of the radiator, and a first pump operable to circulate coolant throughout the first coolant loop; a second coolant loop comprising a sub-cooler having an inlet connected to an outlet of a second stage of the intercooler, a second tank having an inlet connected to an outlet of the sub-cooler and having an outlet connected to an inlet of the second stage intercooler, and a second pump operable to circulate coolant throughout the second coolant loop; and a fluid connection between the first coolant loop and the second coolant loop.

A method for cooling an engine and cooling combustion air being supplied to the engine by a turbo-charger is also described herein, the method comprising the steps of: providing a first cooling loop comprising cooling passages formed in the engine, a first intercooler disposed in a flow of the combustion air, a radiator disposed in a flow of ambient air and having an inlet in fluid communication with an outlet of the engine cooling passages and an outlet of the first intercooler, and a first pump for circulating coolant therethrough; and providing a second cooling loop comprising a second stage intercooler disposed in the flow of combustion air downstream of the first stage intercooler, a subcooler disposed in the flow of ambient air upstream of the radiator and having its inlet in fluid communication with an outlet of the second stage intercooler, and a second pump for circulating coolant therethrough.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
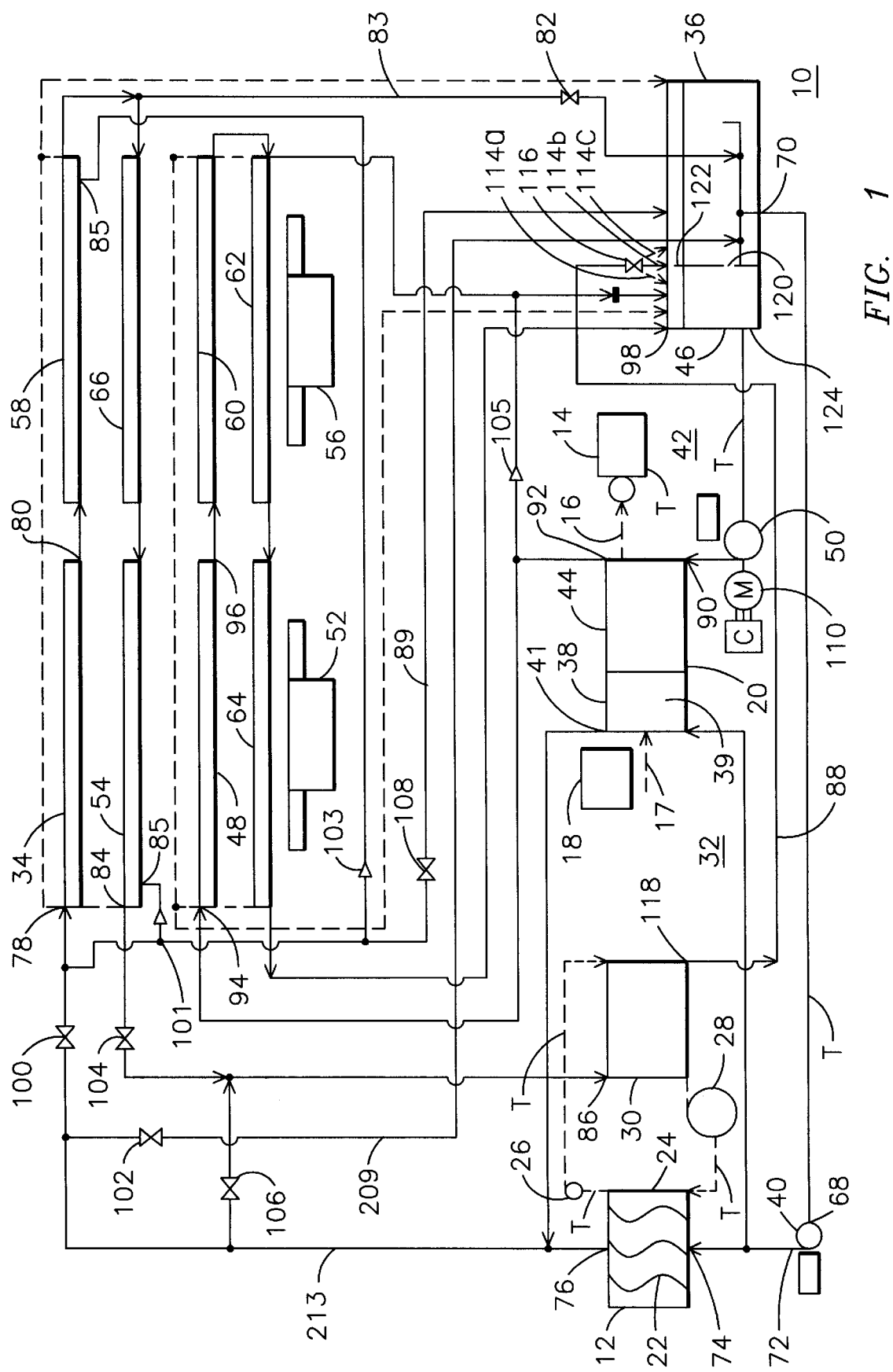
FIG. 1 is a schematic illustration of a cooling system for a turbocharged diesel locomotive.

FIG. 1 is a schematic illustration of an improved cooling system for a turbocharged internal combustion engine, such as may be utilized on a rail locomotive. The cooling system 10 includes a turbocharged diesel engine 12 having an intake air manifold 14 for receipt of combustion air 16 from a turbo charger 18 through a two stage intercooler 20. The term two stage intercooler is meant to include any heat exchanger having two separate flows of cooling fluid for cooling the combustion air 16, with the two flows of cooling fluid advantageously being provided at two different temperatures. The intercooler 20 may be formed as a single assembly or as two separate components. The engine 12 includes a plurality of internally formed cooling passages 22 as well as internally formed lubricating oil passages 24. Lubricating oil is circulated through the oil passages 24 by oil pump 26. The lubricating oil circuit also includes an oil filter 28 and a lubricating oil cooler 30. The cooling system 10 of FIG. 1 includes two coolant loops 32,42 with a selected interchange of coolant between the loops, as will be explained more fully below.

The first coolant loop 32 includes the engine coolant passages 22, a radiator 34, a first coolant tank 36, a first stage intercooler 38 (the first stage of two stage intercooler 20), a first pump 40, the water side of oil cooler 30, and interconnecting piping and valves. The second coolant loop 42 includes the second stage intercooler 44, a second coolant tank 46, a subcooler 48, a second pump 50, and interconnecting piping and valves. A fan 52 is positioned to move ambient air across radiator 34 and subcooler 48, with subcooler 48 being located upstream from radiator 34 in the flow ambient air. Interposed between radiator 34 and subcooler 48 in the ambient air flow stream is oil cooler subcooler 54.

FIG. 1 illustrates a second fan 56, a second radiator 58 connected in series with radiator 34, three additional subcoolers 60, 62, 64 connected in series with subcooler 48, and a second oil cooler subcooler 66 connected in series with oil subcooler 54. These additional components serve to increase the heat transfer capacity of the system by forming a redundant set of components wherein fan 52 provides cooling ambient air to subcoolers 64, 48, 54, and radiator 34 respectively, while fan 56 provides cooling ambient air to subcoolers 62, 60, 66, and radiator 58 respectively. In order to simplify the description of the invention herein, only one set of such components may be discussed below, but it should be recognized that multiple parallel arrangements of such components are envisioned within the scope of the invention.

By viewing the interconnection among the various components illustrated in FIG. 1, one may appreciate that coolant may be circulated through the first coolant loop 32 by pump 40. Pump 40 is illustrated as being driven by a direct mechanical connection to engine 12, such as by a belt or drive shaft, and therefore would operate at a speed proportional to the engine speed. It is also possible to power pump 40 in any other manner known in the art to obtain a fixed or variable speed. Pump 40 has an inlet 68 connected to an outlet 70 of tank 36. Pump 40 has an outlet 72 connected to an inlet 74 of the engine cooling passages 22. Coolant is heated as it passes through engine 12, and heated coolant is delivered out of an outlet 76 of engine cooling passages 22. The term "heated coolant" is used herein to refer to coolant having passed through a component being cooled, whereas the term "cooled coolant" is used herein to refer to coolant having passed through a component being heated by the coolant. The heated coolant flowing from outlet 76, combined with coolant from the outlet 41 of the first stage intercooler 38, may be directed through several paths, as illustrated in FIG. 1. The heated coolant may first be directed to an inlet 78 of radiator 34. Coolant passing out of an outlet 80 of radiator 34 (and radiator 58) may be directed back to tank 36 through valve 82, or alternatively may be directed through oil subcooler 54 (and subcooler 66). Coolant exiting oil subcooler 54 at outlet 84 may be directed to an inlet 86 of oil cooler 30. After passing through oil cooler 30, the heated coolant is returned by conduit 88 to coolant tank 36 and/or coolant tank 46, as will be described more fully below.

Coolant contained in tank 46 may be drawn by second pump 50 and delivered to an inlet 90 of second stage intercooler 44. It may be appreciated that first stage intercooler 38 is located upstream in a flow of combustion air 16 relative to second stage intercooler 44. Coolant flowing from the outlet 92 of second stage intercooler 44 is directed to an inlet 94 of subcooler 48. Cooled coolant exiting the outlet 96 of subcooler 48 is directed back to an inlet 98 of tank 46, in this embodiment through subcoolers 60, 62, 64.

Valves 100, 102 work individually and together as a radiator bypass valve by directing a selected portion of the heated coolant either through radiator 34 and valve 100 or around radiator 34 through valve 102 directly to tank 36. The action of these valves as well as valve 82, 104, and valve 106 function collectively as an oil cooler inlet control valve operable to selectively direct coolant to the oil cooler inlet 86 either from the engine cooling passages outlet 76 and/or from the radiator outlet 80. For example, when engine 12 is cold and it is desired to utilize heated coolant exiting outlet 76 as a source of heat to warm the lubricating oil in oil cooler 30, valves 100, 104 may be closed to isolate the radiator 34 and oil subcooler 54, and valve 106 may be opened to direct the heated coolant to oil cooler 30. As the temperature of engine 12 increases and it is desired to transfer heat to the ambient air, fan 52 may be energized, valves 100, 104 may be opened, and valve 106 may be closed. The movement of these valves may be a step change or the valves may be controlled to gradually or continuously change the flow of coolant through the radiator 34.

It may be desirable to maintain the rate of flow of coolant through oil cooler 30 to be a constant value, or within a predetermined flow rate range, as the coolant flow bypassing the radiator 34 is changed from a maximum bypass flow rate to a minimum bypass flow rate. To accomplish this control, oil cooler subcooler bypass valve 82 may be gradually opened as the bypass flow is decreased, thereby splitting the flow exiting radiator 34 between tank 36 and oil cooler subcooler 54. When valves 100, 104 are closed to isolate radiator 34 and oil cooler subcooler 54, valve 82 and drain valve 108 may be opened to allow radiator 34 and subcooler 54 to drain into tank 36. Thus during periods when no heat dump to atmosphere is needed, radiator 34 and subcooler 54 may be drained to eliminate any concern regarding freezing therein.

The operation of the second coolant loop 42 is determined by the operation of pump 50. Pump 50 is illustrated as being driven by motor 110 which may be a fixed speed or variable speed motor, although any method of powering pump 50 known in the art may be used. In one embodiment motor 110 is an alternating current motor connected to an electrical generator powered by the engine 12. In this embodiment, the speed of motor 110 and pump 50 when energized will be proportional to engine speed, with the option of de-energizing motor 110 to stop the flow of coolant through the second coolant loop 42. When motor 110 and fan 52 are energized, coolant circulates within second coolant loop 42 to extract heat from combustion air 16 and transfer it to the ambient air. A maximum cooling capacity is thereby provided in second coolant loop 42 because the coolant is exposed to the ambient air in subcooler 64 prior to the ambient air being heated by subcooler 54 or radiator 34. Furthermore, a maximum of efficiency and cooling capability may be achieved through the use of a two stage intercooler 20 having the capability of transferring heat from the combustion air 16 to two coolant loops operating at two different temperatures. Thus, the system of FIG. 1 is useful in reducing the temperature of the turbocharged combustion air 16 during periods of high ambient temperature and maximum engine power level. There may be, however, modes of operation where the cooling capacity of the second coolant loop 42 is somewhat excessive. For example, with pump 50 and fan 52 operating during relatively cool ambient conditions, the temperature of the combustion air 16 being supplied to the engine inlet air manifold 14 may drop below a desirable minimum level. In this situation, fan 52 may be intermittently stopped or changed to a lower speed of operation. Alternatively, the speed of pump 50 may be changed in other applications. However, it is undesirable to provide fan 52 or pump 50 with continuously variable speeds due to the complexity and expense of the attendant control systems. Therefore, fan 52 may be provided with only a limited number of operating speeds, and there may be operating conditions where the rate of heat rejection necessary to maintain equilibrium falls somewhat between the available fan speeds. In order to avoid the excessive cycling of fan 52 between its various speeds, the apparatus 10 of FIG. 1 is provided with a means for selectively directing heated coolant from the first coolant loop 32 into the second coolant loop 42. One such means is illustrated as the three alternative flow paths 114A, 114B, 114C provided at the outlet of conduit 88. Valve 116 is disposed in conduit 88 and is operable to direct heated coolant flowing from the oil cooler outlet 118 to one of the first tank 46, the second tank 36, or both the first and second tanks 46, 36 through conduit 114A, 114C, and 114B respectively. In one mode of operation the heated coolant leaving oil cooler 30 is directed through outlet 114C of conduit 88 to tank 36. In this mode there is no interchange between the coolants of first cooling loop 32 and second cooling loop 42. In situations where the amount of cooling being provided by the second coolant loop 42 is excessive, valve 116 may be positioned to direct the flow of heated coolant from conduit 88 into outlet 114A and tank 46, thereby somewhat warming the temperature of the coolant in tank 46 and flowing into the inlet 90 of second stage intercooler 44. The flow of heated coolant may be balanced between the first tank 36 and second tank 46 by being directed to a shared outlet 114B or some combination of outlets 114A and C. In this manner, the system designer is provided with an additional degree of flexibility for tailoring the heat rejection capabilities of system 10 to balance the conflicting needs for cooling in the intercooler 20, oil cooler 30, and engine cooling passages 22.

One may appreciate that when coolant is directed from the first coolant loop 32 to tank 46, the water level in tank 46 may rise relative to the water level in tank 36. A balancing port 120 may be provided as a fluid communication flow path between tanks 36, 46 to maintain equilibrium in the relative levels of the tanks. Furthermore, a spillway 122 may be provided to provide additional fluid flow capacity between the tanks 36, 46. One may appreciate that as coolant is directed from the first coolant loop 32 to the second coolant loop 42 through valve 116, there may arise a flow from tank 46 to tank 36 through port 120. The location and sizing of the port 120 and spillway 122 may be designed to promote mixing of the fluid flowing therethrough with the bulk fluid remaining within the tanks so that the outlets 70, 124 of tanks 36, 46 respectively are provided with fluid having a representative average temperature in the tank to the extent possible.

Figure 2:
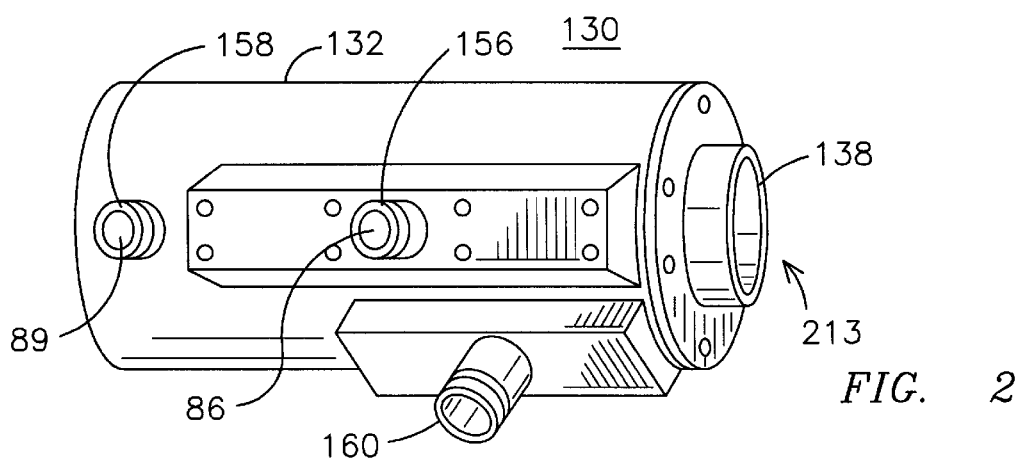
FIGS. 2–5 are perspective views of a rotor-sleeve flow control valve as may be used in the cooling system of FIG. 1.
Figure 3:
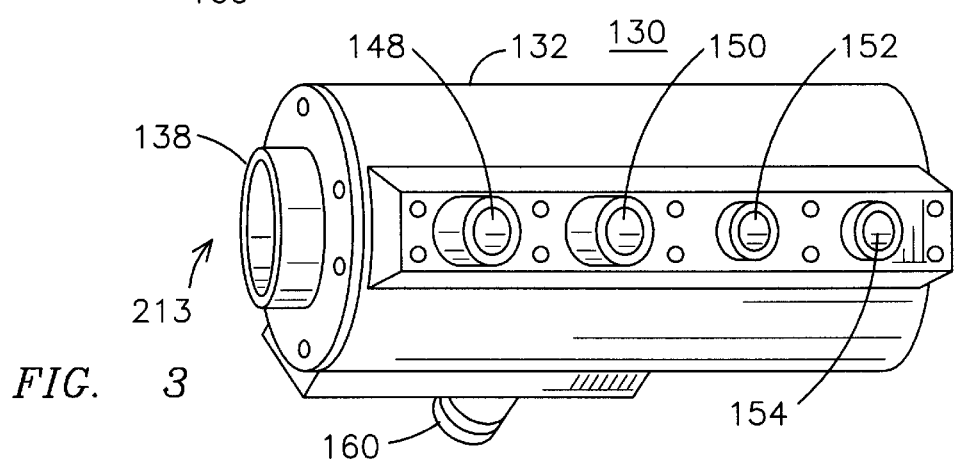
Figure 4:
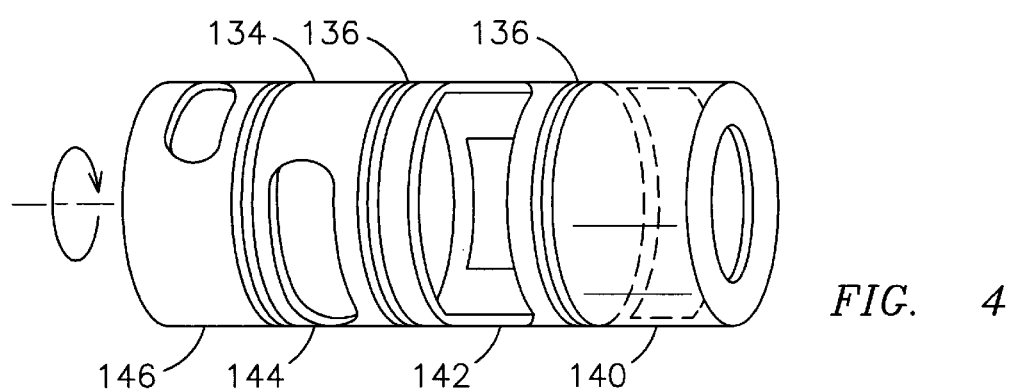
Figure 5:
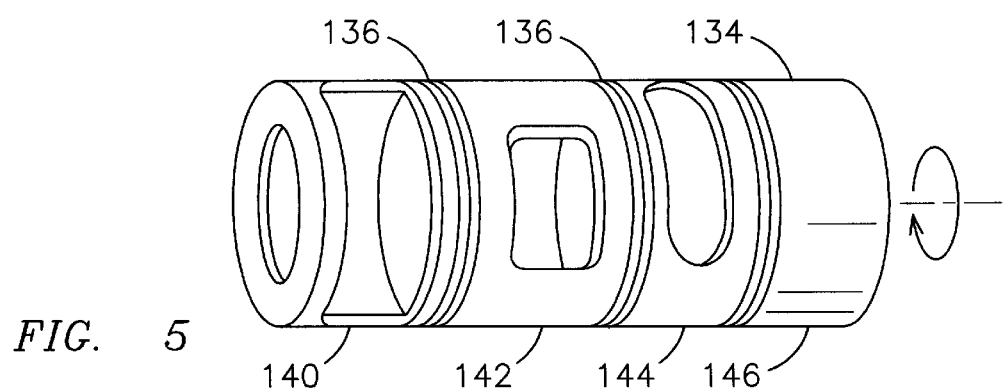

The functions of valves 82, 100, 104, 106, 108 may be combined into a single rotor-sleeve valve 130, as illustrated in FIGS. 2–5 and 7. FIGS. 2, 3 are perspective views of such a flow control valve 130 taken from opposite sides of the exterior sleeve 132 of the valve 130 illustrating the various connections thereto. FIGS. 4, 5 are perspective views of opposite sides of the rotor 134 which is inserted into sleeve 132 to form flow control valve 130. Valve 130 is divided into four sections by three perimeter seals such as O-ring seals 136 formed on the exterior of rotor 134. An inlet 138 to flow control valve 130 is connected to the outlet 76 of engine cooling passages 22 and is thereby supplied with heated coolant. The sections of rotor 132 may be identified as the hot rotor section 140, the warm rotor section 142, the cold rotor section 144, and the drain rotor section 146. External connections through sleeve 132 are provided for each of these respective rotor sections, including a radiator inlet connection 148, a radiator outlet connection 150, an oil cooler subcooler outlet 152, and a drain valve inlet connection 154. Also formed on the opposed side of sleeve 132 is a oil cooler inlet connection 156 which spans rotor sections 140, 142, and 144 but selectively communicates with only rotor sections 140 and 144. Also formed on sleeve 132 is a drain connection 158. Also formed on the sleeve 132 is a water tank inlet connection 160 which spans and headers together two rotor sections 140, 142.

Figure 7:
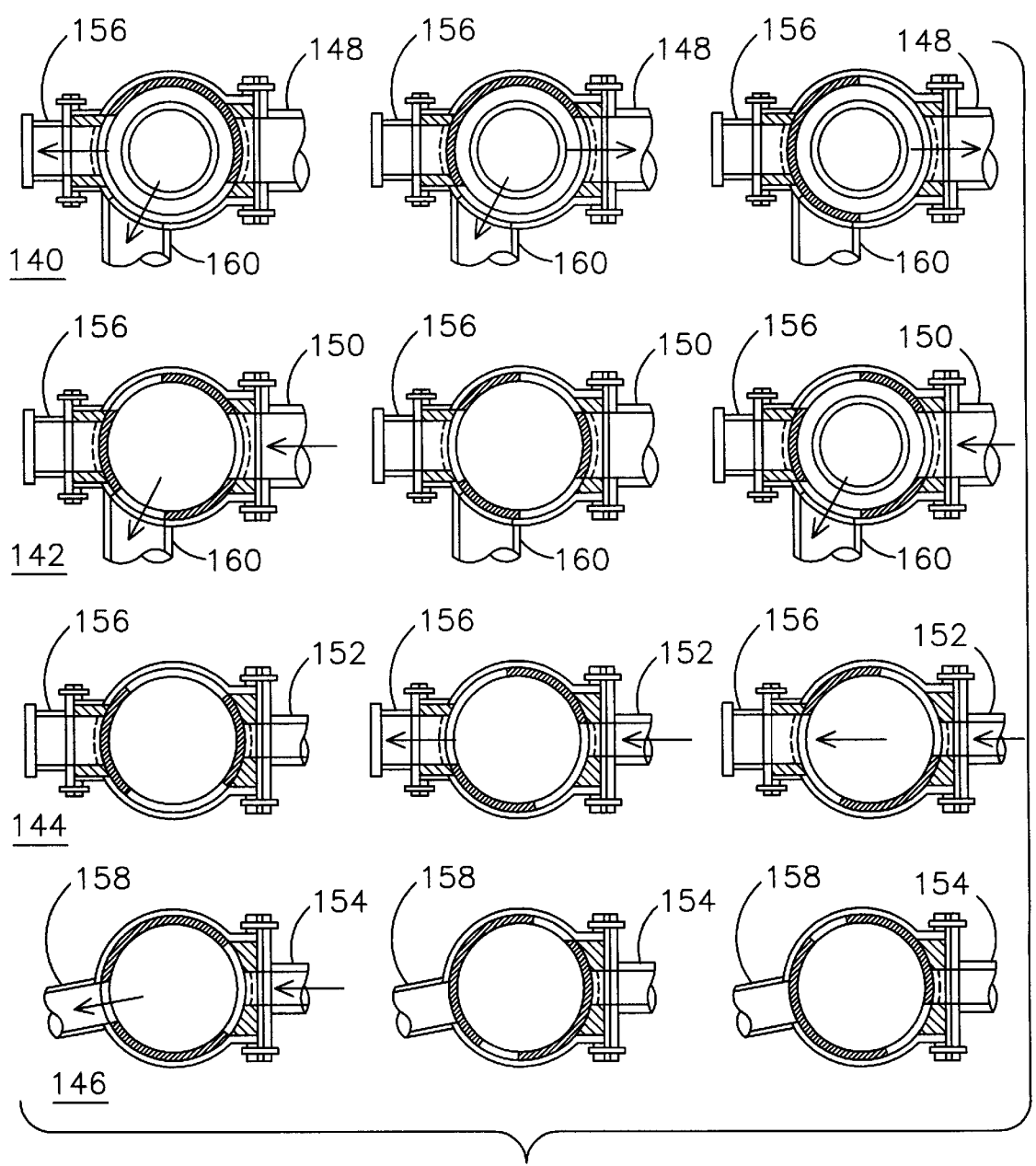
FIG. 7 is a matrix of cross-sectional views through four sections the valve of FIG. 2 to illustrate flows through various ports with the valve in three different positions.

The operation of flow control valve 130 may be further appreciated by considering FIG. 7 together with the following discussion. FIG. 7 is a matrix of cross-sectional views through the four rotor sections 140,142,144,146 (top to bottom of drawing) of valve 130. The views show the relative position of the sleeve 132 and rotor 134 at three valve positions, labeled as 0 degrees, 60 degrees and 120 degrees from left to right in the drawing. Coolant flow is indicated by arrows where appropriate.

The first row of cross-sections of FIG. 7 illustrates the flow through valve 130 at the hot rotor section 140. Heated coolant is flowing into the valve from pipe 213 in a direction into the plane of the drawing through port 138 as seen on FIGS. 2 and 3. At the 0 degree position, heated coolant is directed to tank 36 through port 160 and to the oil cooler 30 through port 156. Thus, port 160 functions as valve 102 and port 156 functions as valve 106. This position may be used to provide engine heat to the oil through oil cooler 30. At 90 degrees, the heated coolant is directed to the tank 36 through port 160 and to the radiator 34 through port 148, with the balance of these two flows being determined by the pressure drop through the two flow paths. Thus, port 148 functions as valve 100. As the valve is rotated toward the 120 degree position, more heated coolant is gradually directed to the radiator 34 through port 148 until at the 120 position the flow path to the tank 36 is completely closed. One may appreciate that the position of valve 130 may be changed in small increments or in a single step between the various illustrated positions, as will be described more filly below.

The second row of cross-sections of FIG. 7 illustrates the flow through valve 130 at the warm rotor section 142. Coolant cooled by the radiators 34,58 enters the valve 130 from conduit 83 (FIG. 1) through port 150. Port 156 is blocked in all valve positions. Coolant exits the valve 130 to tank 36 through port 160 in the 0 and 120 degree positions. Since no flow is passing through the radiators 34,58 in the 0 degree position, this port is acting as a drain. Between the 60 and 120 degree positions, the amount of flow directed to tank 36 is gradually increased as the total flow through the radiators 34,58 is increased, thus maintaining the total flow through the oil cooler 30 within a predetermined range. Thus, this warm section 142 functions as valve 82 of FIG. 1.

The third row of cross-sections of FIG. 7 illustrates the flow through valve 130 at the cold rotor section 144. Coolant enters the valve 130 from the outlet 84 of oil cooler subcoolers 54,66 through port 152 in the 60–120 degree positions. All flow is isolated in the 0 degree position, thereby preventing backflow into the oil cooler subcoolers 54,66 during periods when they are isolated from inlet flow. This section 144 of flow control valve 130 functions as valve 104 in FIG. 1.

The fourth row of cross-sections of FIG. 7 illustrates the flow through valve 130 at the drain rotor section 146, which corresponds to the function of drain valve 108 of FIG. 1. Coolant enters valve 130 through port 154 and exits through port 158 into conduit 89 in the 0 degree position only. In other positions the flow is isolated at both ports 154,158.

The operation of the cooling system of FIG. 1 will now be described with reference to the various modes commonly encountered in the operation of a locomotive. Mode 3 is used when starting and warming the engine 12, during operation at low power levels, and operation at low ambient air temperatures. The first cooling circuit 32 is in the "no cooling" position with radiator inlet valve 100 closed and all heated coolant from the engine outlet 76 being forced through the open radiator bypass valve 102 to tank 36, and through the open radiator bypass valve 106 to supply heat to the oil cooler 30. Subcooler bypass valve 82 is opened to allow the radiator 34, 58 and oil cooler subcoolers 54, 66 to drain to tank 36. Valve 104 between the oil subcooler outlet 84 and the oil cooler inlet 86 is closed to prevent back filling of the oil cooler subcooler 54 with heated coolant from the opened valve 106. The drain valve 108 is opened to connect both ends of the radiators 34, 58 and the downstream end of the oil cooler subcoolers 54, 66 to the first water tank 36. Check valves 101, 103 opened to completely drain the radiators 34, 58 and subcoolers 54, 66 when valve 100 closes and the pressure in the drain line 89 becomes equal to that in the water tank 36. In Mode 3 the second water pump 50 is switched off and the subcoolers 48, 60, 62, 64 drain through their respective inlets, outlets, and check valve 105, which opens in the absence of pressure from pump 50. Because there is no coolant flow in the radiators 34, 58 and subcoolers 54, 66, 48, 60, 62, 64, radiator fans 52, 56 are not activated.

Mode 2 is used when the engine water temperature (EWT), as measured at the outlet 76 of the engine cooling passages 22 or at an equivalent location, and/or the manifold air temperature (MAT) as measured at manifold 14 or an equivalent location, rises above preset limits due to higher engine power level and/or ambient air temperature. An appropriate control system (not illustrated) may sense such a rise in EWT and/or MAT and may signal the motor 110 to begin operation of second pump 50, thereby closing check valve 105 due to the resultant coolant pressure. Fans 52,56 are also started to provide ambient air flow over the various water/air heat exchangers. Coolant will then flow through the subcoolers 48, 60, 62, 64, providing heat rejection in the second stage intercooler 44 to reduce the MAT. The various flow control valves will remain in the above described positions, keeping the radiators 34, 58 and oil cooler subcoolers 54, 66 drained, with the oil cooler 30 continuing to warm the lube oil with heated coolant from the engine 12 through valve 106. Whenever EWT rises too high or MAT becomes too low, valve 116 is actuated to send coolant outflow from the oil cooler 30 to outlet 114A and tank 46, thereby warming the second coolant loop 42 and raising the temperature of the MAT. The ability of valve 116 to transfer heat in the form of heated coolant from the first cooling loop 32 to the second coolant loop 42 and thereby to hold MAT constant despite overcooling in the second cooling loop 42, makes the cooling system 10 a single circuit system in Mode 2, with all cooling provided by subcoolers 48, 60, 62, 64. The means for selectively directing coolant from the first coolant loop 32 to the second coolant loop 42, such as illustrated by valve 116 and outlets 114 A,B,C, provides an important function of manifold air temperature control (MATCNT). This MATCNT function is especially advantageous if fans 52, 56 are provided with a limited number of discreet operating speeds. One may appreciate that at most operating conditions, multi-speed fans 52,56 must cycle between two available speeds in order to approximate a given required heat rejection. Without MATCNT, this cycling results either in the MAT fluctuating outside of prescribed limits or in the fans 52, 56 cycling between two speeds at an undesirably high rate. With MATCNT, the fans 52, 56 may be held at the higher speed as long as coolant from the first coolant loop 32 is hot enough to hold MAT above the minimum specified temperature. In one application, a minimum fan cycle time of three minutes is specified in order to provide adequate protection for the fan motors. In that embodiment, the thermal energy available in the first coolant loop 32 may be sized to provide an adequate inventory of heat energy so that the fan speed may be held at a higher temperature for at least three minutes before cycling again to the lower speed.

Mode 1 is used for higher power levels and for warmer ambient temperatures. In the prior art, Mode 1 was typically used to refer to a single line up of valve positions. In the present invention, however, Mode 1 refers to a range of cooling system capabilities. The system capacities range from a maximum cooling position analogous to the Mode 1 of prior art systems to a position having minimal flow through the radiator 34 and oil subcooler 54. The various levels of cooling capacity between the maximum and minimum conditions will be dependent upon the number of discreet valve position increments available in the actuators associated with the various valves 82, 100, 104, 106, 108. One may appreciate that by using a single flow control valve 130 as illustrated in FIGS. 2–15 and 7, the ability to provide a large number of cooling positions is made much simpler than when discreet control valves are provided for each position. The term Mode 1.n is given to this flow control valve position capability, where "n" is the number of reduced cooling positions that the flow control valve 130 and its associated actuator are designed to provide for a particular application. In the Mode 1 configuration, pump 50 is operating and the second coolant circuit 42 is active as in Mode 2. However, the various flow control valves move beyond the positions described above in order to flood the radiators 34, 58 and subcoolers 54, 66 and therefore provide greater cooling system heat rejection capability. A non-zero but reduced flow through the radiators 34, 58 in Mode 1.n is achieved with radiator bypass valve 102 fully opened. In this position, the oil cooler 30 receives coolant from the oil cooler subcoolers 54, 66 through valve 104, and drain valve 108 is closed. As the EWT and MAT rise, greater cooling is provided by the repositioning of the respective flow control valves to progressively close the radiator bypass valve 102 to increase the flow through the radiators 34,58, while simultaneously opening the subcooler bypass valve 82 to hold the flow through oil cooler 30 to within a predetermined range of flow rates. MATCNT is active in Mode 1 to hold MAT above the minimum specified temperature despite possible overcooling conditions such as when the engine power level is reduced or when the speed of fans 52, 56 is increased to a overly high operating speed.

Figure 6:
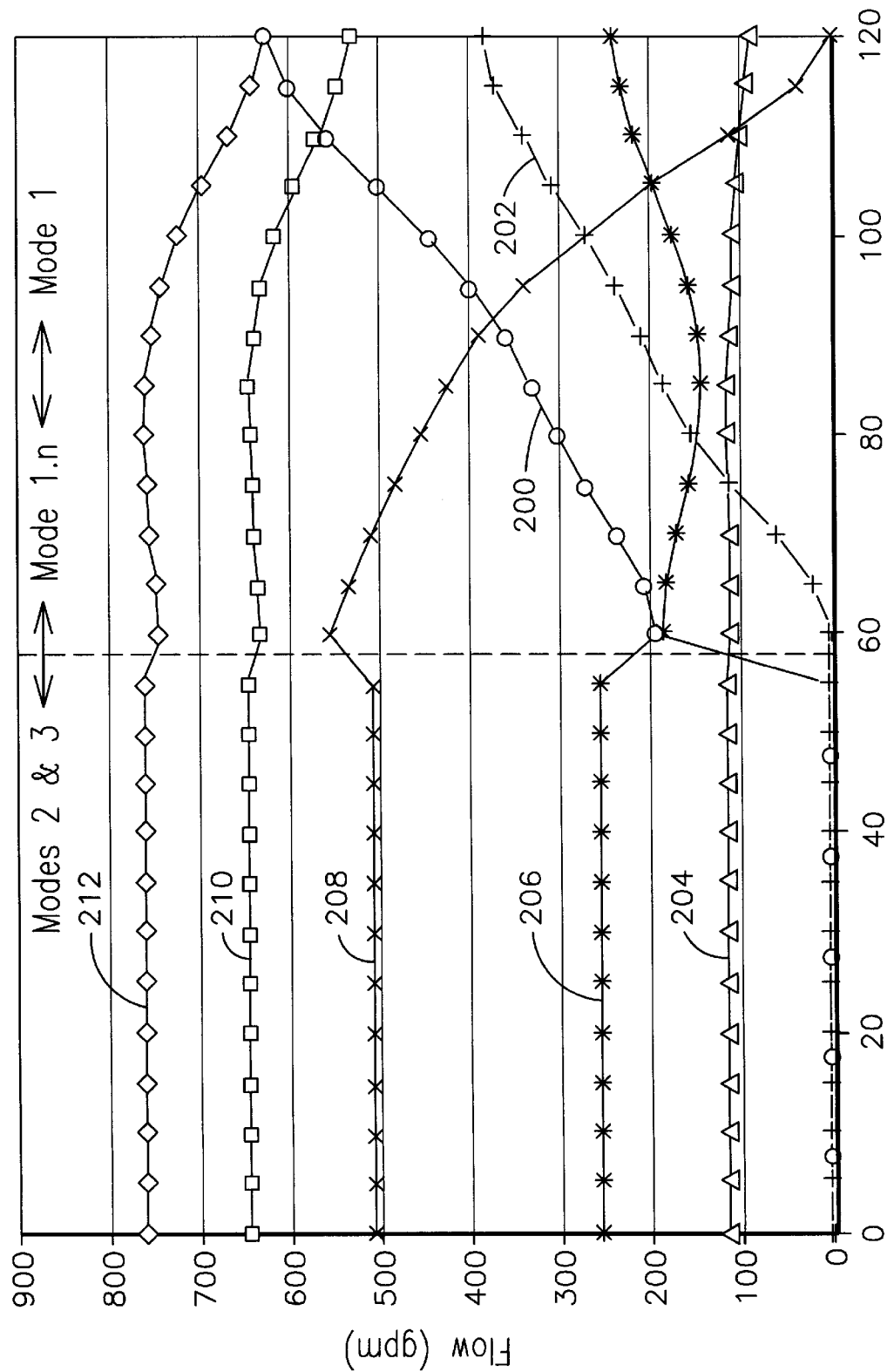
FIG. 6 is a graph of various flow rates occurring in the cooling system of FIG. 1 as the valve of FIG. 2 is rotated through its range of positions.

FIG. 6 illustrates the coolant flows at various points in the first coolant loop 32 of cooling system 10 of FIG. 1 as the system is operated in Modes 1, 1.n, 2 and 3. The vertical axis of FIG. 6 indicates the flow rate in gallons per minute with pump 40 operating at high speed. The horizontal axis of FIG. 6 indicates a relative position of rotor-sleeve flow control valve 130. The various curves illustrate the flow rates at various locations in system 10 as illustrated in FIG. 1. These flows are described below with reference to the individual valves 82,100,104,106,108, although the horizontal axis represents the combination of these valves into a single rotor-sleeve valve 130. Curve 200 is the flow through radiator 34. Curve 202 is the subcooler bypass flow flowing through valve 82. The difference between these flows represents the amount of coolant flowing through the oil subcoolers 54, 66. Note that below approximately 55 degree valve position these flows are both zero and therefore are drawn together. Curve 204 indicates the flow rate through the first stage intercooler 38. Curve 206 indicates the flow rate through oil cooler 30. Curve 208 indicates the radiator bypass flow rate to tank 36 through conduit 209 as illustrated in FIG. 1. Curve 210 illustrates the flow rate through the engine cooling passages 22. Finally, Curve 212 illustrates the combined flow through the engine cooling passages 22 and the first stage intercooler 38, through conduit 213, and is the algebraic sum of Curves 204 plus 210. Mode 3 is illustrated by valve positions 0–55. As the flow control valve 130 approaches the 60 degree position, pump 50 is energized to enter cooling Mode 2. As the flow control valve 130 is further rotated toward valve position 120 degrees, the various Mode 1.n positions are achieved, thereby providing a varying degree of cooling to the various portions of the system 10. In the embodiment of FIG. 6, the flow through oil cooler 30 as illustrated by Curve 206 is maintained within a range of approximately 260 GPM to 150 GPM. Furthermore, the flow through oil cooler 30 during the important heat up Mode 3 and maximum cooling Mode 1 are both near a maximum design flow rate for the cooler 30.

It may be desirable to provide a baffle 85 near the outlet 84 of subcooler 54 in order to maintain the subcooler full of water during periods of reduced flow operation. Such a baffle will minimize thermally induced distortion and stress by keeping all of the tubes of the subcoolers 54, 66 at nearly the same temperature. A similar baffle 85 may be provided near the outlet and of radiator 58. The proper positioning of such baffles will not impede the draining of the respective radiator or subcooler because drainage flow occurs through the inlet of the respective radiators/subcoolers.

The radiators 34, 58 and oil cooler subcoolers 54, 66 may be integrally constructed with additional, independently piped, second circuit subcoolers 48, 60, 62, 64 in the upstream air flow. By design, the radiator 34 and subcooler 54 are first provided with reduced flow and then drained before the second circuit subcoolers 48, 60,62, 64 are drained as cooling capacity is reduced. Similarly, they are filled after the second coolant loop 42 is placed into operation as cooling capacity is increased. The arrangement of these components and the filling and draining procedure is designed to provide the first coolant loop 32 with heat from the second circuit subcoolers 48, 60, 62, 64 when the former are most prone to freezing. In addition to controlling water temperature during high power operation, flow control valve 130 may also be configured for low ambient air temperature and/or engine warm up conditions. In that configuration, the radiator 34 and oil subcooler 54 are drained to tank 36 and the heated coolant from engine 12 is directed to the oil cooler 30 and first stage intercooler 38. This configuration is equivalent to Mode 3 in the prior art when the second pump 50 is switched off and the subcoolers 48, 60, 62, 64 are drained. The two stage intercooler 20 uses input coolant streams of varying temperatures from two semi-independent circuits 32, 42. The outlet 72 of pump 40 is connected directly to the inlet 39 of the first stage 38 of intercooler 20 in all modes. A portion of the coolant drawn from tank 36 by pump 40 is directed around engine 12 and into the first stage intercooler 38 in all modes. The first stage intercooler 38 is always active and heats the combustion air 16 when the turbo discharge air 17 is lower than the water temperature at pump discharge 72 and cools the combustion air 16 when the turbo discharge air 17 is hotter than the pump discharge water temperature. The second stage intercooler 44 is inactive when the combustion air 16 is below a specified minimum temperature but becomes active when hotter turbo discharge air 17 forces combustion air 16 temperature above a specified minimum and pump 50 is thereupon activated. When turbo discharge air 17 temperature is high, the second stage intercooler 44 serves to prevent emissions from engine 12 resulting from overly high combustion air 16 temperatures. The MATCNT raises or lowers the MAT by returning heated coolant from the oil cooler 30 (or alternatively other heated coolant points within first coolant loop 32) to the second tank 46 or to the first tank 36 as needed for MAT temperature control. The combination of these features provides a cooling system 10 having improved performance capabilities. In one embodiment, the Tier I NOX limits imposed by the environmental protection agency may be achieved without the use of air-to-air heat exchangers for the intercoolers. Furthermore, the engine water temperature and oil temperature may be controlled within tighter limits than with prior art systems, while limiting the necessity for fan speed changes. Furthermore, the system of FIG. 1 avoids freezing of the coolant by the use of interconnected yet separately drainable cooling circuits, thereby avoiding the use of shutters for isolating the heat exchangers from the ambient air.

The single rotary flow control valve 130 provides improved reliability by combining in one package the functions of several independent valves. Valve 130 may be operated by any type of actuator known in the art, such as a pneumatic, hydraulic or mechanical actuator. In one embodiment, valve 130 is operated by a rack and pinion mechanism having 10 degree notch steps between 60 and 120 degrees and having a single step between 0 and 60 degrees. To achieve the advantages described above, it is desirable to have some ability to modulate the various flows by positioning valve 130 at a plurality of positions between 60 and 120 degrees.

While the preferred embodiments of the present invention have been shown and described therein, it will be obvious that such embodiments are provided by way of example only. Numerous variations, changes and substitutions will occur to those of scaling the art without departing from the invention herein. Accordingly, it is intended that the invention be limited only by the spirit and scope of the appended claims.

We claim as our invention:

1. A locomotive engine having coolant passages formed therethrough and having a turbocharger for providing combustion air through an intercooler having coolant passages formed therethrough, the engine further having a cooling apparatus comprising:
    a first coolant loop comprising a radiator having an inlet connected to an outlet of the engine coolant passages, a first tank having an inlet connected to an outlet of the radiator and an outlet connected to an inlet of the engine coolant passages, a first stage of the intercooler having an inlet connected to the outlet of the first tank and an outlet connected to the inlet of the radiator, and a first pump operable to circulate coolant throughout the first coolant loop;
    a second coolant loop comprising a sub-cooler having an inlet connected to an outlet of a second stage of the intercooler, a second tank having an inlet connected to an outlet of the sub-cooler and having an outlet connected to an inlet of the second stage intercooler, and a second pump operable to circulate coolant throughout the second coolant loop; and
    a fluid connection between the first coolant loop and the second coolant loop.

2. The locomotive engine of claim 1, the engine having an engine oil cooler having coolant passages formed therethrough, wherein an inlet of the engine oil cooler is connected to the outlet of the radiator, and wherein the fluid connection between the first coolant loop and the second coolant loop further comprises:
    a port connected between the first tank and the second tank; and
    a means for selectively directing coolant flowing from an outlet of the engine oil cooler to the first tank and to the second tank.

3. The locomotive engine of claim 2, further comprising a spillway between the first tank and the second tank.

4. The locomotive engine of claim 1, wherein the first pump is powered by the locomotive engine and the second pump is powered by an electric motor.

5. The locomotive engine of claim 2, further comprising:
    a radiator bypass valve in fluid communication between the engine coolant passages outlet and the radiator inlet and operable to bypass a selected portion of coolant past the radiator to the first tank;
    a fluid connection between the outlet of the engine cooling passages and the inlet of the engine oil cooler; and
    an oil cooler inlet control valve operable to selectively direct coolant to the oil cooler inlet from the engine coolant passages outlet and from the radiator outlet.

6. The locomotive engine of claim 5, wherein the radiator bypass valve and the oil cooler inlet control valve comprise a rotor sleeve valve operable to maintain the coolant flow rate through the oil cooler within a predetermined flow rate range as the coolant flow bypassing the radiator is changed from a maximum bypass flow rate to a minimum bypass flow rate.

7. The locomotive engine of claim 2, wherein the means for selectively directing an outlet of the engine oil cooler to the first tank and to the second tank further comprises:
    a conduit having an inlet in fluid communication with the outlet of the oil cooler and a first outlet in fluid communication with the first tank and a second outlet in fluid communication with the second tank;
    a valve disposed in the conduit and operable to direct coolant flowing from the oil cooler outlet selectively to the first tank and to the second tank.

8. An apparatus for controlling the temperature of combustion air entering a locomotive engine from a turbocharger, the apparatus comprising:
    a first stage intercooler disposed in a flow of combustion air between a turbocharger and an engine inlet air manifold;
    a radiator disposed within a flow of ambient air;
    a first coolant loop interconnecting the first stage intercooler and the radiator and having a first pump for the circulation of coolant therethrough;
    a second stage intercooler disposed in the flow of combustion air downstream of the first stage intercooler;
    a subcooler disposed in the flow of ambient air upstream of the radiator;
    a second coolant loop interconnecting the second stage intercooler and the subcooler and having a second pump for the circulation of coolant therethrough.

9. The apparatus of claim 8, further comprising a first tank in fluid communication with the first coolant loop downstream of the radiator and upstream of the first stage intercooler;
    a second tank in fluid communication with the second coolant loop downstream of the subcooler and upstream of the second stage intercooler;
    a fluid interconnection between the first tank and the second tank.

10. The apparatus of claim 9, further comprising a means for selectively directing heated coolant from the first coolant loop to the first tank and to the second tank.

11. The apparatus of claim 9, further comprising an engine oil cooler in fluid communication with the first coolant loop and having an outlet for heated coolant;

a means for selectively directing the heated coolant to the first tank and to the second tank.

12. The apparatus of claim 11, further comprising engine cooling passages having an inlet connected to the first tank outlet and an outlet connected to the radiator inlet;

wherein the first coolant loop further comprises a radiator bypass valve for selectively bypassing a portion of the coolant around the radiator to the first tank; and an oil cooler inlet control valve in fluid communication with an inlet of the engine oil cooler and operable to selectively direct coolant to the oil cooler inlet from the engine coolant passages outlet and from the radiator outlet.

13. The apparatus of claim 12, wherein the radiator bypass valve and the oil cooler inlet control valve comprise a rotor sleeve valve operable to maintain the coolant flow rate through the oil cooler within a predetermined flow rate range as the coolant flow bypassing the radiator is changed from a maximum bypass flow rate to a minimum bypass flow rate.

14. A method for cooling an engine and cooling combustion air being supplied to the engine by a turbo-charger, the method comprising the steps of:

providing a first cooling loop comprising cooling passages formed in the engine, a first intercooler disposed in a flow of the combustion air, a radiator disposed in a flow of ambient air and having an inlet in fluid communication with an outlet of the engine cooling passages and an outlet of the first intercooler, and a first pump for circulating coolant therethrough; and providing a second cooling loop comprising a second stage intercooler disposed in the flow of combustion air downstream of the first stage intercooler, a subcooler disposed in the flow of ambient air upstream of the radiator and having its inlet in fluid communication with an outlet of the second stage intercooler, and a second pump for circulating coolant therethrough.

15. The method of claim 14, further comprising the step of is providing a fluid flow path between the first cooling loop and the second cooling loop.

16. The method of claim 14, operating in a Mode 1 further comprising the steps of:

operating both the first pump and the second pump to establish coolant flow in both the first cooling loop and the second cooling loop;

bypassing a selected portion of the coolant flow around the radiator as a function of engine temperature; and transferring a selected portion of heated coolant from the first cooling loop to the second cooling loop to maintain the temperature of the combustion air within a predetermined range.

17. The method of claim 16, further comprising the steps of:

providing an engine oil cooler in the first cooling loop;

wherein the step of transferring a selected portion of heated coolant from the first cooling loop to the second cooling loop comprises transferring a selected portion of heated coolant flowing from an outlet of the engine oil cooler to the second cooling loop.

18. The method of claim 17, further comprising the step of maintaining the rate of flow of coolant through the engine oil cooler within a predetermined range as the rate of flow of coolant bypassing the radiator is varied.

19. The method of claim 14, further comprising the step of providing a fan for moving the ambient air across the radiator;

increasing the speed of the fan from a first speed to a second faster speed in response to the engine temperature exceeding a predetermined value;

operating the fan at the second speed for a predetermined time interval; and transferring a selected portion of heated coolant from the first cooling loop to the second cooling loop while the fan is operating at the second speed in order to maintain the temperature of the combustion air exiting the second stage intercooler above in a predetermined value.

20. The method of claim 14, further comprising the step of providing a fan for moving the ambient air across the radiator;

increasing the speed of the fan from a first speed to a second faster speed in response to the engine temperature exceeding a predetermined value;

operating the fan at the second speed for a predetermined time interval; and bypassing a selected portion of coolant around the radiator while the fan is operating at the second speed in order to maintain the engine temperature above a predetermined value.

* * * * *